United States Patent [19]
Jahoda et al.

[11] Patent Number: 5,402,265
[45] Date of Patent: Mar. 28, 1995

[54] FOG-FREE MIRROR DEVICE

[76] Inventors: Peter Jahoda, 154 N. Avenida Palmera, Anaheim, Calif. 92807; Ralph C. Lowes, 21405 Brookhurst St. Ste 490, Hungtington Beach, Calif. 92646

[21] Appl. No.: 22,667

[22] Filed: Mar. 1, 1993

[51] Int. Cl.6 .................................. G02B 5/08
[52] U.S. Cl. .................. 359/512; 359/507; 359/509
[58] Field of Search ........... 359/507, 509, 512, 838, 359/871, 883; 4/597, 598, 601, 605; 219/219

[56] References Cited

U.S. PATENT DOCUMENTS

| 3,867,175 | 2/1975 | Dornte | 359/507 |
|---|---|---|---|
| 3,935,367 | 1/1976 | Merrill et al. | 359/507 |
| 4,076,374 | 2/1978 | Schwab | 359/509 |
| 4,170,688 | 10/1979 | Roentgen et al. | 359/883 |
| 4,750,335 | 6/1988 | Wallace et al. | 62/248 |
| 5,148,311 | 9/1992 | Beavers et al. | 359/507 |
| 5,173,804 | 12/1992 | Dogey | 359/507 |

Primary Examiner—Loha Ben
Assistant Examiner—Thong Nguyen
Attorney, Agent, or Firm—Macro-Search Corp.

[57] ABSTRACT

A flexible fog free mirror device for contact attachment and support on a planar surface is disclosed. A three-layered structure includes a first film sheet having an organic coating of anti-fog material on one side. The other side of the sheet has an adhesive coating for laminating the sheet to a first side of a second film sheet. The second side of the second sheet has a reflective metal coating for providing a mirrored finish. The reflective metal coating is laminated to a first side of a cling vinyl film sheet. The vinyl sheet enables the three-layer structure to contact adhere to the planar surface. In an alternate embodiment, a two-layered structure includes the first film sheet and the second film sheet for releasable attachment to an existing mirrored surface. The first film sheet has the organic coating of anti-fog material coated on the one side, the other side of which is coated with a pressure sensitive adhesive. The first side of the second film sheet has a release coating of silicone compound so that the second film sheet may be stripped from the first film sheet to expose the pressure sensitive adhesive layer. As such, the first film sheet may be adhered to the mirrored surface whereby the mirrored surface remains fog-free in a high humidity environment. A printed indicia is included on the other side of the first film sheet.

4 Claims, 3 Drawing Sheets

FOG-FREE MIRROR DEVICE

FIELD OF THE INVENTION

This invention relates generally to mirrors, and, more particularly, is directed towards a flexible fog-free mirror device for releasable attachment to a planar surface.

BACKGROUND OF THE INVENTION

In a high humidity environment, such as a bathroom, water tends to condense on conventional mirrors, rendering such mirrors unusable. While one may use a cloth or rag to wipe away the condensation on such a "fogged-up" mirror, condensation quickly recurs, especially just after one has taken a shower or bath and the humidity level in the bathroom remains high. Further, wiping a fogged-up mirror with a cloth tends to leave undesirable streak marks on the mirror that are visible even after the humidity in the bathroom decreases and the mirror no longer has condensation.

Another drawback to conventional bathroom mirrors is that people who travel frequently often find that the mirrors in their motel rooms have been broken. Many people, in fact, are dismayed to find that their motel bathrooms do not even have a mirror. In such cases, a travel mirror is extremely helpful. However, because mirrors are inherently rigid and somewhat fragile, conventional travel mirrors tend to be small for travel convenience and safety.

Clearly, then, there is a need for a portable mirror that resists condensation and may be conveniently rolled-up to reduce its travel size. Such a mirror would be flexible and would have a means by which to releasable attach it to a planar surface, such as an existing mirror or wall surface. Further, such a mirror would be relatively inexpensive to manufacture and easy to transport and use. Such a mirror, moreover, would be unbreakable and would not shatter into sharp glass fragments upon impact with another object. The present invention fulfills these needs and provides further related advantages.

SUMMARY OF THE INVENTION

The present invention is a flexible fog free mirror device for contact attachment and support on a planar surface. In one embodiment, a three-layered structure includes a first film sheet having an organic coating of anti-fog material on one side. The organic coating enables the one side of the sheet to resist fogging from a high humidity environment. The other side of the sheet has an adhesive coating for laminating the sheet to a first side of a second film sheet. The second side of the second sheet has a reflective metal coating for providing a mirrored finish. The reflective metal coating is laminated to a first side of a cling vinyl film sheet. The vinyl sheet enables the three-layer structure to contact adhere to the planar surface. The vinyl sheet further has a stripable paper liner attached by contact to the second side of the vinyl sheet to protect the second side prior to use of the fog-free mirror device. In an alternate embodiment of the invention, a two-layered structure includes the first film sheet and the second film sheet for releasable attachment to an existing mirrored surface. The first film sheet has the organic coating of anti-fog material coated on the one side. The other side of the sheet is coated with a pressure sensitive adhesive layer which is pressed into releasable adhesive contact with the first side of the second film sheet. The first side of the second film sheet has a release coating of silicone compound so that the second film sheet may be stripped from the first film sheet to expose the pressure sensitive adhesive layer. As such, the first film sheet may be adhered to the mirrored surface whereby the mirrored surface remains fog-free in a high humidity environment. A printed indicia may be included on the other side of the first film sheet.

The present invention is a portable mirror that resists condensation and may be conveniently rolled-up to reduce its size for storage or travel. The present device is flexible and has a means by which to releasably attach it to a planar surface, such as an existing mirror or wall surface. Further, the mirror of the present invention is relatively inexpensive to manufacture and easy to transport and use. The present invention, moreover, is safe in that it is unbreakable and cannot shatter into sharp glass fragments upon impact with another object. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
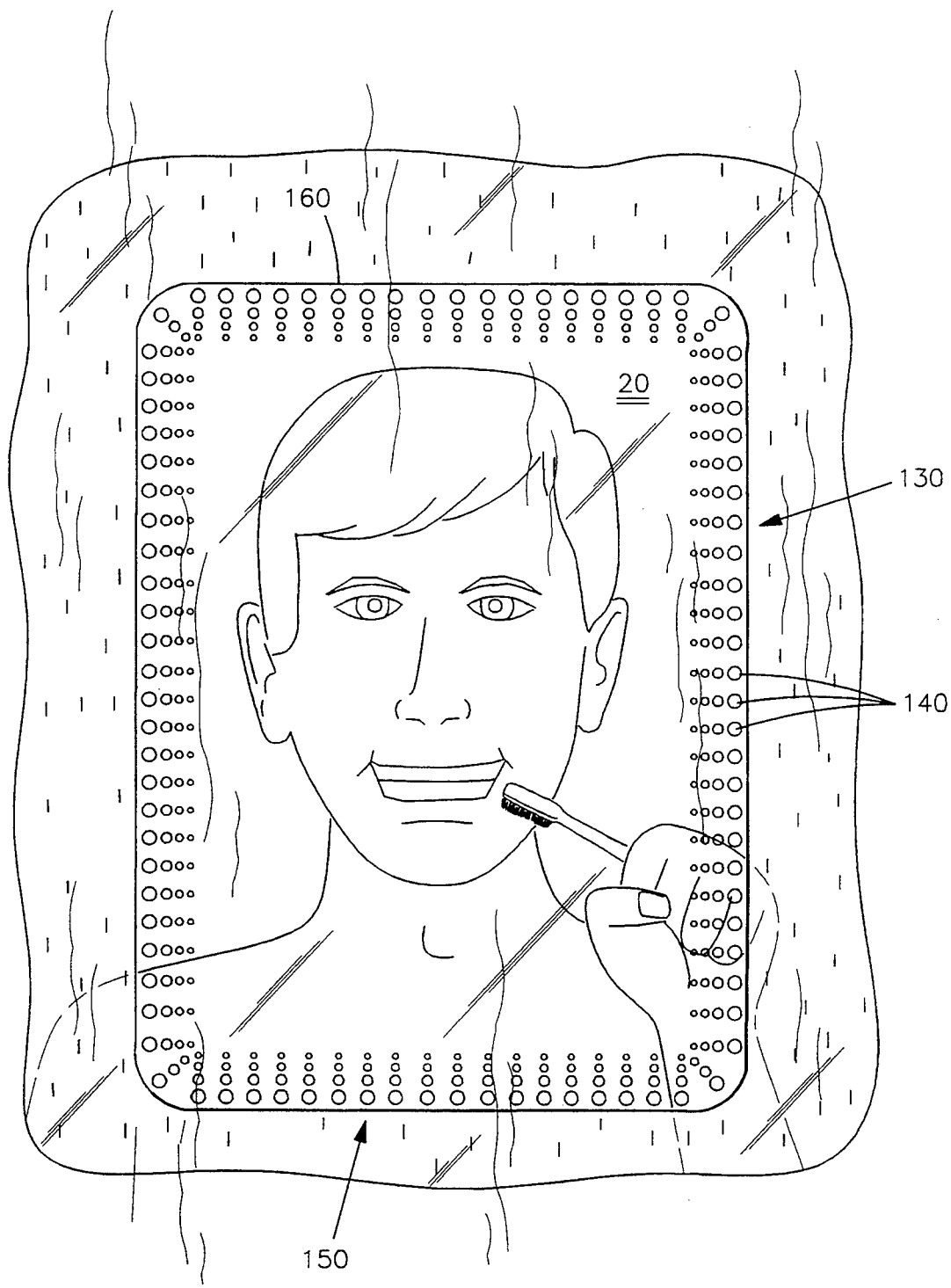
FIG. 1 is a front elevational view of the invention, illustrating the invention as attached to and supported by a planar surface.
Figure 2:
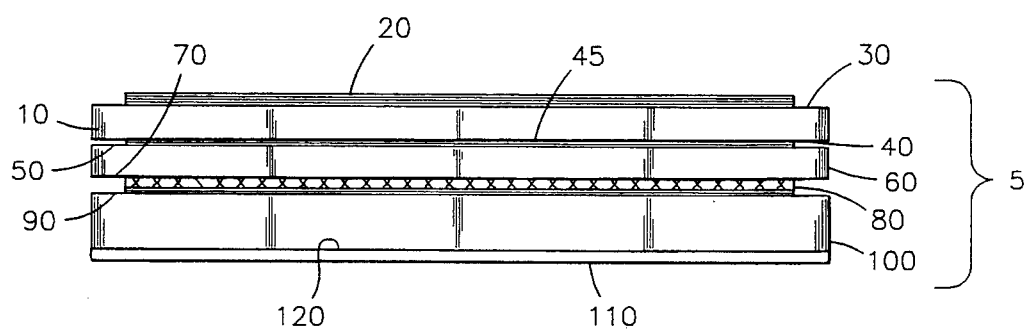
FIG. 2 is a cross sectional view of the invention, illustrating a three-layered embodiment thereof.

FIGS. 1 and 2 illustrate a flexible fog free device for contact attachment and support on a planar surface. A three-layered structure 5 includes a first film sheet 10 having an organic coating 20 of anti-fog material on one side 30. The organic coating 20 may be any of the well known and commercially available coatings such as supplied by Hydromer, Inc. of Whitehouse, N.J.; their coating material number 2009-68-2, or by Film Specialties, Inc., also of Whitehouse, N.J.; their product VISTEX(TM) fog-free film. The organic coating 20 enables the one side 30 of the sheet 10 to resist fogging from a high humidity environment. The other side 40 of the sheet 10 has an adhesive coating 45 for laminating the sheet 10 to a first side 50 of a second film sheet 60. The second side 70 of the second sheet 60 has a reflective metal coating 80 for providing a mirrored finish. Such a reflective metal coating 80 may be created by silver metal vapor deposition, for example. The reflective metal coating 80 is laminated to a first side 90 of a cling vinyl film sheet 100. The vinyl sheet 100 enables the three-layered structure 5 to contact adhere to the planar surface. The vinyl sheet further has a stripable paper liner 110 attached by contact to the second side 120 of the vinyl sheet 100 to protect the second side 120 prior to use of the fog-free mirror device.

Figure 3:
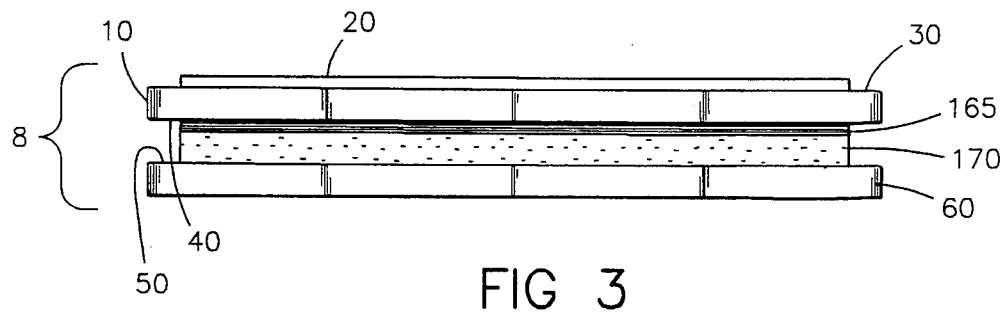
FIG. 3 is a cross sectional view of the invention, illustrating a two-layered embodiment thereof.

An alternate embodiment of the invention is shown in FIG. 3, wherein a two-layered structure 8 includes the first film sheet 10 and the second film sheet 60 for releasable attachment to a mirrored surface. The first film sheet 10 has the organic coating 20 of anti-fog material coated on the one side 30. The other side 40 of the sheet 10 is coated with a pressure sensitive adhesive layer 165 which is pressed into releasable adhesive contact with the first side 50 of the second film sheet 60. The first side 50 of the second film sheet 60 has a release coating 170 of silicone compound, for example, so that the second film sheet 60 may be stripped from the first film sheet 10 to expose the pressure sensitive adhesive layer 165. As such, the first film sheet 10 may be adhered to any common mirror, such as in a toilet facility or shower, whereby the device remains fog-free in a high humidity environment. Preferably, the pressure sensitive adhesive layer 165 is a clear based adhesive, such as an acrylic based type, that provides visibility through the first sheet 10 to enable use of the mirror.

Figure 4:
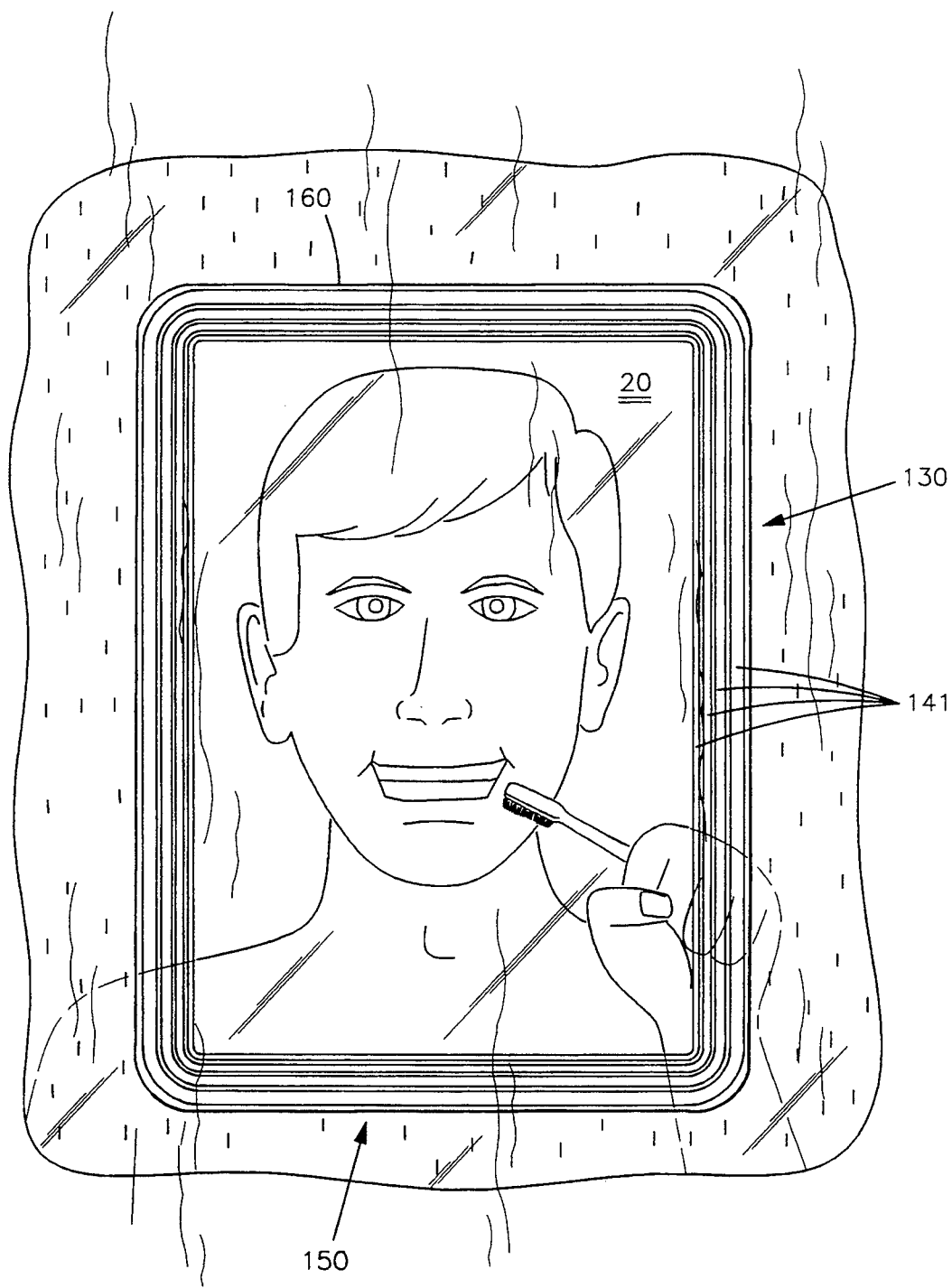
FIG. 4 is a front elevational view of the invention similar to FIG. 1 and depicting an alternate indicia format.

Preferably, a printed indicia 130 is included on the other side 40 of the first film sheet 10. The indicia 130 comprises a series of geometrical shapes 140 arranged to form a border design 150 around the periphery of the device so as to draw attention away from the edge 160 of the device. In a preferred arrangement of the boarder design 150, a series of rectangular patterns are arranged as shown in FIGS. 1 and 4, such that the indicia may be made up of individual geometrical shapes 140, or solid lines 141, but in either case, the visual effect of the diminution of size or width of the design is such that the eye is drawn away from the peripheral edge 160 of the device toward the center of the device.

In use, a suitably planar surface is selected. In the embodiment of the invention having the three-layered structure including a mirrored layer, the selected surface is preferably a glass surface, such as an existing mirror or window. The cling vinyl will also adhere to a suitably smooth wall surface, such as a shower wall or a smooth wall painted with a glossy paint. In the embodiment of the invention having the two-layered structure without an integral mirrored layer, a pre-existing mirrored surface must be selected. The flexible device of the present invention is then placed into contact with the surface and manually flattened against the surface to remove any air trapped between the surface and the device, thereby causing the cling vinyl to adhere to the surface. The present device may then be used as a mirror in a normal fashion. The present invention is flexible so that it may be configured into a roll for easy storage for travel convenience. Further, the present invention is relatively safe in that it will not shatter into sharp fragments as a in the case of a conventional mirror.

While the invention has been described with reference to a preferred embodiment, it is to be clearly understood by those skilled in the art that the invention is not limited thereto. For example, while polyester sheets 10,60 are preferred, other suitable transparent sheet materials may could easily be used. Thus, the scope of the invention is to be interpreted only in conjunction with the appended claims.

What is claimed is:

1. A flexible fog free mirror for contact attachment and support on a planar surface comprising:
    a three-layered structure including, a first film sheet having an antifog organic coating on a one side of the first film sheet, the organic coating enabling the surface to resist fogging from a high humidity environment, an other side of the first film sheet having an adhesive coating, said adhesive coating being laminated to;
    a first side of a second film sheet, a second side thereof having a reflective metal coating thereon, the second sheet for providing a mirrored finish, said metal coating being laminated to;
    a first side of a cling vinyl film sheet, the vinyl sheet enabling the three-layered structure to contact adhere to the planar surface, the vinyl sheet further having a strippable paper liner attached by contact thereto to protect the vinyl sheet;
    the first and second and the vinyl film sheets mutually arranged and sized to form a single mutually coincident peripheral edge defining the extent of the fog free mirror, a printed indicia on said other side of the first film sheet comprising a series of geometrical shapes arranged in lines adjacent to the peripheral edge to form a rectangle outlining the fog free mirror to draw attention away from the peripheral edge of the fog free mirror.

2. The mirror of claim 1 wherein the geometrical shapes comprise a linear series of progressively smaller rectangles arranged adjacent to and around the peripheral edge, each of the rectangles comprising a series of geometrical shapes, the size of the shapes being smaller in each successive rectangle further away from the peripheral edge.

3. A flexible fog free mirror for contact attachment and support on a planar surface comprising:
    a three-layered structure including, a first film sheet having an antifog organic coating on a one side of the first film sheet, the organic coating enabling the surface to resist fogging from a high humidity environment, an other side of the first film sheet having an adhesive coating, said adhesive coating being laminated to;
    a first side of a second film sheet, a second side thereof having a reflective metal coating thereon, the second sheet for providing a mirrored finish, said metal coating being laminated to;
    a first side of a cling vinyl film sheet, the vinyl sheet enabling the three-layered structure to contact adhere to the planar surface, the vinyl sheet further having a strippable paper liner attached by contact thereto to protect the vinyl sheet;
    the first and second and the vinyl film sheets mutually arranged and sized to form a single mutually coincident peripheral edge defining the extent of the fog free mirror, a printed indicia on said other side of the first film sheet comprising a series of lines adjacent to the peripheral edge to form a rectangle outlining the fog free mirror to draw attention away from the peripheral edge of the fog free mirror.

4. The mirror of claim 3 wherein the lines comprise a series of progressively smaller rectangles arranged adjacent to and around the peripheral edge, the width of the lines being smaller in each successive rectangle further away from the peripheral edge.

* * * * *